United States Patent [19]

Leussler et al.

[11] Patent Number: 5,013,342
[45] Date of Patent: May 7, 1991

[54] CENTRIFUGAL SEPARATOR AND GRANULAR FILTER UNIT

[75] Inventors: Wilhelm Leussler, Frankfurt; Robert Würl, Nidderau; Herbert Schlaffer, Kelsterbach, all of Fed. Rep. of Germany

[73] Assignee: Metallgesellschaft Aktiengesellschaft, Frankfurt am Main, Fed. Rep. of Germany

[21] Appl. No.: 444,889

[22] Filed: Dec. 1, 1989

[30] Foreign Application Priority Data

Dec. 1, 1988 [DE] Fed. Rep. of Germany ....... 3840510

[51] Int. Cl.$^5$ .......................... B01D 45/12; B04C 9/00
[52] U.S. Cl. .......................... 55/337; 55/349; 55/350; 55/459.1
[58] Field of Search ................ 55/318, 320, 337, 349, 55/350, 459.1, 460

[56] References Cited

U.S. PATENT DOCUMENTS

| Re. 28,396 | 4/1975 | Berz et al. | 55/337 X |
| 739,263 | 9/1903 | Kenney | 55/459.1 X |
| 3,636,682 | 1/1972 | Rush | 55/459.1 |
| 3,802,570 | 4/1974 | Dehne | 55/459.1 X |
| 3,897,228 | 7/1975 | Berz | 55/350 X |
| 4,026,687 | 5/1977 | Berz | 55/350 X |
| 4,210,427 | 7/1980 | Brett et al. | 55/350 X |
| 4,295,867 | 10/1981 | Shopin et al. | 55/320 X |
| 4,519,822 | 5/1985 | Hatano et al. | 55/459.1 |
| 4,572,727 | 2/1986 | Masayuki et al. | 55/459.1 X |
| 4,865,633 | 9/1989 | Stevenson | 55/459.1 X |

FOREIGN PATENT DOCUMENTS

| 2038553 | 5/1972 | Fed. Rep. of Germany | 55/350 |
| 2720888 | 11/1977 | Fed. Rep. of Germany | 55/459.1 |
| 582002 | 12/1977 | U.S.S.R. | 55/337 |
| 768476 | 10/1980 | U.S.S.R. | 55/459.1 |

Primary Examiner—Robert Spitzer
Attorney, Agent, or Firm—Herbert Dubno

[57] ABSTRACT

Centrifugal separator and a granular bed filter are arranged one over the other in a common cylindrical housing to constitute a unit for separating solid particles from a gas stream. For more effective separation of solid particles within a structure having a given overall volume, the gas inlet pipe is rectangular in cross-section and has a height amounting to 60 to 80% and a width amounting to 20 to 30% of the height H and a gas guide is provided in the gas outlet pipe and extends parallel to the axis of the pipe. This will result in an optimum matching of the separation of solid particles affected by centrifugal force and in the granular bed in close succession in the single structural unit.

20 Claims, 4 Drawing Sheets

CENTRIFUGAL SEPARATOR AND GRANULAR FILTER UNIT

FIELD OF THE INVENTION

Our present invention relates to a centrifugal separator or cyclone separator associated with a granular bed filter and forming a single structural unit therewith, to systems constituted of a plurality of such units and, in general, to improvements in granular bed filters and centrifugal separators.

More particularly, this invention relates to an apparatus for separating solid particles from a gas stream and comprising a centrifugal separator and a granular bed filter, which are arranged one over the other in a common cylindrical housing to constitute a single structure unit. In this unit the centrifugal separator is arranged at the bottom and comprises a housing part having a height H and provided with a tangential gas inlet pipe, a dust-collecting bin, which adjoins the housing part at its bottom and is provided with an outlet, and a centrally disposed gas outlet pipe, which extends through the top wall. The granular bed filter is traversed from top to bottom and comprises a granular bed space which is disposed over a grate and has the shape of a circular ring surrounding the gas outlet pipe and a gas outlet pipe arranged in the housing part between the grate and the top wall.

BACKGROUND OF THE INVENTION

In an apparatus of the above-described type the filter beds must periodically be freed from dust which has deposited therein. This is usually effected by back-purging with a purging gas stream while the unit is shut off for the normal flow of gas therethrough. The duration and frequency of the purging phases will depend on the requirements in each case.

Fixed intervals of times may be programmed or the purging phases may be initiated when predetermined measured values have been reached.

In cases in which the raw gas does not exhibit appreciable fluctuations in rate, temperature and dust loading, a simple timer will be used. More differentiated control means will be required under strongly changing conditions.

A control which is dependent on the dust content of the pure gas is only of restricted utility because the measurements are relatively expensive and closed-loop control systems depending on said measurements is too slow in most cases. For this reason, it is usual to measure the pressure drop across each filter bed. That pressure drop increases continuously with the dust loading and when it exceeds a predetermined value a control pulse for initiating the automatic purging phase can be generated.

However, it has been found that satisfactory results cannot be obtained in such cases if the conventional granular bed filter is preceded by a centrifugal separator because the dust loading in the filter bed often has a highly irregular distribution so that certain portions of the filter bed are utilized only to a subaverage degree and other portions are overloaded with dust between two purging phases.

These phenomenon result in erroneous measurements and will involve a need for relatively long purging times if the portions which have been overloaded with dust are also to be cleaned as completely as could be effected by the existing back-purging system in case of a uniform dust loading. Longer purging times will result in a less favorable ratio of the deducting time to the purging time and—if a plurality of apparatuses are used in the usual manner—fewer apparatus will be available at the same time for a collection of dust and more units will have to be provided for a given application.

It is apparent that an irregular loading of the filter beds will have an adverse effect not only on the accuracy of measurement but also on the operating costs (higher purging air requirement) and on the plant costs (more units).

OBJECTS OF THE INVENTION

It is an object to ensure in an apparatus of the kind described first hereinbefore a more uniform loading of the filter beds so that gases can be more economically dedusted with such apparatus.

Another object of this invention is to provide an apparatus having improved filtering efficiency and capable of being backpurged in an economical and effective manner.

Still another object of the invention is to provide an improved combination of a centrifugal or cyclone-type separator and granular bed filter in a single structural unit whereby drawbacks of earlier systems can be avoided.

SUMMARY OF THE INVENTION

These objects are achieved in accordance with the invention by making the gas inlet pipe rectangular in cross-section and with a height amounting to 60% to 80% and a width amounting to 20 to 30% of the height H of the housing part and by providing gas guiding means in the gas outlet pipe to extend parallel to the axis of said pipe.

By extensive investigations it has been found that the irregular dust loading of the filter beds is due to the fact that the gas stream often is not uniformly distributed over the entire flow-receiving area and that the gas stream comprises streaks which have a low dust content and streaks having a high dust content.

Both phenomena are due to the fact that the granular bed filters, which are capable of an optimum operation only under flow conditions which are as uniform as possible, are preceded by centrifugal separators which require highly different flow conditions for performing an effective separation.

If it is also required that the two separators should be installed within the smallest possible space, the disturbances and differential distributions caused in the centrifugal separator will strongly affect the granular bed filter because the gas flow path between said units is too short for an automatic uniformization.

That uniformization is essentially effected in accordance with the invention by the gas guiding means which are provided in the gas outlet pipe and extend parallel to the axis of that pipe. The design of the gas inlet pipe also results in a distinct improvement of the separating rate because the incoming gas stream is prepared much better for the centrifugal separation of the dust then in gas inlet pipes having the conventional, nearly square cross-section. As a result, a distinctly larger proportion of dust will be separated before the gas stream enters the granular bed filter. It has also been found that a gas stream which has thus been fed to the centrifugal separator can be uniformized much more effectively because it contains much fewer undesired vortices and flow disturbances.

It is apparent that both features have the result that the gas stream which for the centrifugal separator exhibits great differences as regards velocity and dust loading can effectively be straightened and uniformized for the subsequent deducting in the granular bed filter and the disadvantages outlined hereinbefore can substantially be avoided and the economy of the operation of the entire apparatus can be greatly improved.

More specifically, the above-described objects can be attained in an apparatus which comprises:

a centrifugal separator for removing at least some of the solid particles from the gas stream, the centrifugal separator comprising:

a vertical cylindrical housing formed with a partition separating the housing into an upper part and a lower part of a height H, a rectangular cross section gas inlet duct opening tangentially into the lower part and having a height equal substantially to 60% to 80% of the height H and a width equal substantially to 20% to 30% of the height H, a conically downwardly converging dust-collecting bin disposed below the lower part with the lower part opening axially directly into the bin, an outlet formed at a lower end of the bin for discharging solid particles collected from the gas stream from the bin, a vertical gas outlet pipe disposed centrally in the housing and having a lower end opening in the lower part and an upper end opening in the upper part above the partition, and gas-guiding means in the pipe and extending generally parallel to an axis thereof; and a granular bed filter disposed above the centrifugal separator, receiving the gas stream from the centrifugal separator and discharging the gas stream from the apparatus, the granular bed filter comprising:

a grate extending across the upper part and traversed by the pipe with the upper end of the pipe opening into the upper part of the housing above an annular bed in a shape of a circular ring of filter granules surrounding the upper end of the pipe and supported on the grate, and a gas outlet duct communicating with the upper part of the housing between the grate and the partition for discharging the gas stream, whereby the gas stream traverses the bed from top to bottom, the granular bed filter and the centrifugal separator forming a single structural unit.

According to a feature of the invention, the inside diameter of the lower housing part is substantially equal to the height H thereof while the diameter d of the gas outlet pipe is equal to substantially 44% to substantially 48% of the inside diameter d of this lower housing part.

The gas guiding means can consist of two crossed webs which have a height h equal substantially to 10% to 20% of the inside diameter D and the webs are so arranged in the gas outlet pipe that their bottom edges are upwardly offset from the entrance plane of the gas outlet pipe by a distance h' of substantially 5% to substantially 15% of the inside diameter D.

Furthermore, the gas outlet pipe can be constructed adjacent to the granular bed spacing over a length l of substantially 20% to 26% of the inside diameter, to a diameter $d_1$ which can equal substantially 35% to 40% of the inside diameter D.

The gas outlet pipe can have at its top end a diameter $d_2$ across substantially to 40% to 46% of the inside diameter D and transition portions can be provided between the portions of diameter d and $d_2$ and between the portions of diameter $d_1$ and diameter $d_2$. These transition portions may be frustoconical.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
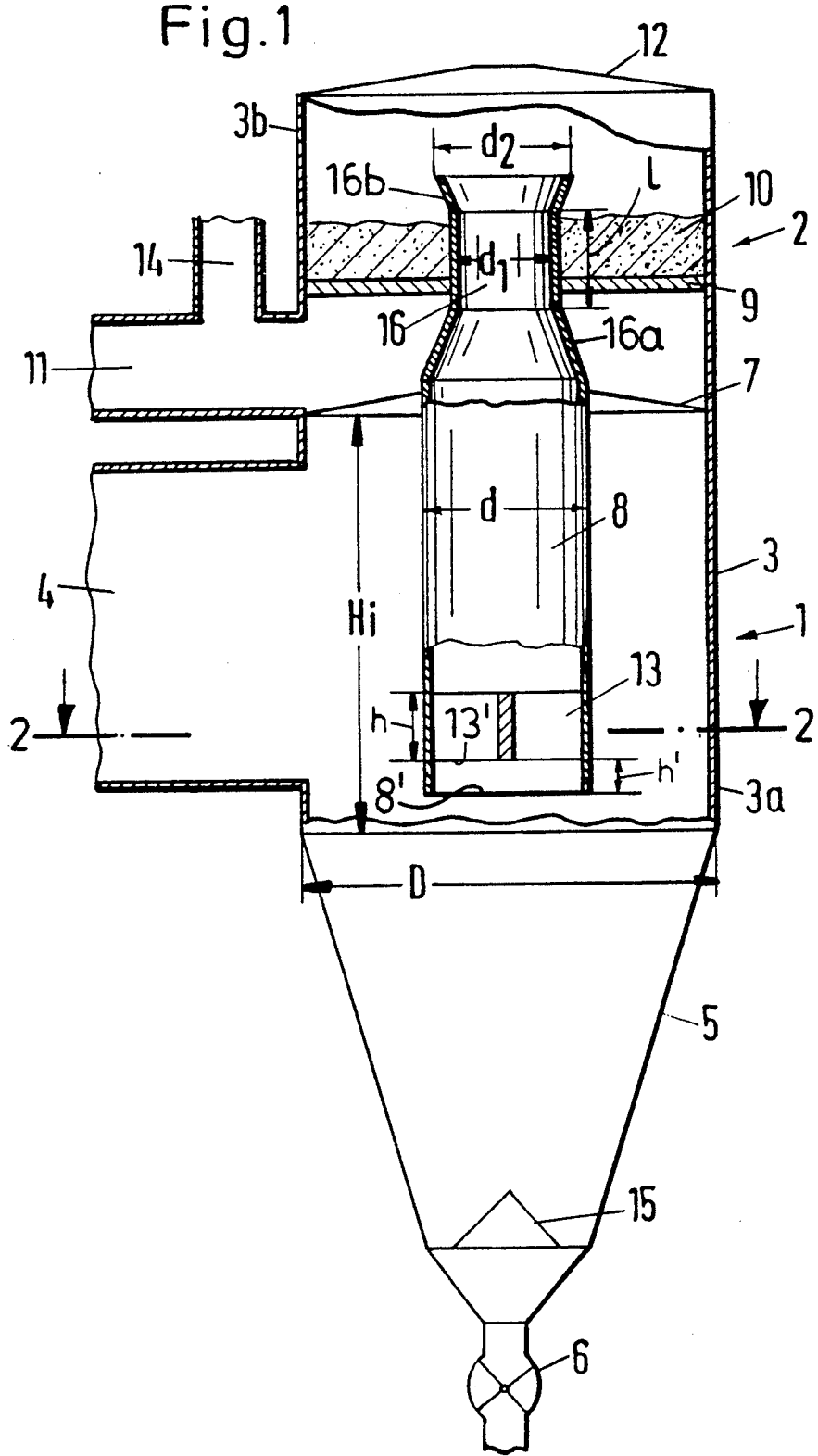
FIG. 1 is a highly simplified vertical sectional view showing an embodiment of the invention.

In the embodiment shown in FIG. 1 a centrifugal separator 1 and a granular bed filter 2 are arranged one directly over the other in a common cylindrical housing 3 to constitute a single structural unit.

That housing part 3a (lower housing part) which is associated with the centrifugal separator 1 has a height H and is provided with a tangential gas inlet pipe 4.

The housing part 3a is adjoined at its bottom by a dust collecting bin 5 that is provided with an outlet 6. The centrally disposed gas outlet pipe 8 extends through the top wall or partition 7 of the centrifugal separator 1 and the grate 9 as well as through the bed space 10 of the granular bed filter 2. That housing part 3b which is associated with the granular bed filter 2 is closed at its top by a cover 12 and below the grate 9 has a gas outlet pipe 11. A purging air duct 14 opens into the gas outlet pipe 11. The function of the duct 14 will be explained more in detail with reference to FIG. 2.

In accordance with the invention the gas inlet pipe 4 has a rectangular cross-section, which has a height amounting to 60 to 80% and a width amounting to 20 to 30% of the height H of T the housing part 3a. The gas outlet pipe 8 contains gas guiding means 13, which are parallel to the axis of the pipe The dust outlet 6 may consist of a star wheel lock. The conical covering 15 provided in the lower portion of the dust collecting bin 5 is intended to prevent a raising and discharge of dust in case of pressure fluctuations in the gas system.

Figure 2:
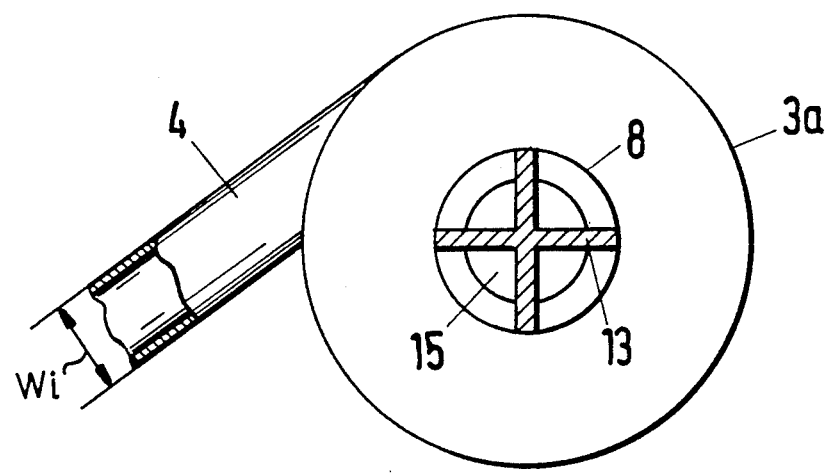
FIG. 2 is a horizontal sectional view taken along section line 2—2 in FIG. 1.

As is readily apparent from FIG. 2 in conjunction with FIG. 1, the gas inlet pipe 4 is designed in accordance with the invention to have a height which is larger than its width This results in a very good and uniform distribution of the incoming gas stream throughout the height H of the housing part 3a and a very effective deducting.

A further considerable improvement of the deducting is due to the fact that a cross-shaped gas guiding device 13 is provided in the gas outlet pipe 8. That device will almost entirely eliminate in the rising gas stream the turbulence which is due to the tangential feeding of the gas so that the circular annular bed space 10 of the granular bed filter 2 will be supplied with dust in a substantially uniform distribution. A further uniformization is effected in that the gas outlet pipe 8 has a constriction adjacent to the granular bed space 10 (see FIG. 1) so that the gas stream is accelerated and further uniformized.

As is apparent also from FIG. 1 of the drawing, the lower housing portion 3a of a height H between the beginning of the frustoconically converging bin 5 and the partition 7, is cylindrical and of an inside diameter D. The gas outlet pipe 8 has an inside diameter d and the gas guides 13 extend axially within the pipe to a height h but have their lower edges 13' at a level h' above the plane 8' of the entrance to the pipe 8 at which the pipe 8 opens in the lower housing portion 3a.

At its upper end, in the upper housing portion 3b, the constriction 16 has a length l between transition portions 16a and 16b which are frustoconical and extend respectively from a portion of the diameter d to a portion of the diameter $d_1$ and a portion of the diameter $d_2$, the latter being the outlet plane of the pipe 8. The diameters d, $d_1$ and $d_2$ should in all cases be internal diameters.

The height of the inlet is represented at Hi and the width of the inlet at Wi (see FIG. 2).

We have found that the following dimensional criteria are important to the effective functioning of the apparatus as described:

The height Hi should equal 60 to 80% of the height H.

The width Wi should equal 20 to 30% of the height H.

The diameter D should be substantially equal to the height H.

The diameter d should be substantially equal to 44 to 48% of the diameter D.

The height h should be 10 to 20% of the diameter D.

The height h' should be 5 to 15% of the diameter D.

The length l should be 20 to 26% of the diameter D.

The diameter $d_1$ should be 35 to 40% of the diameter D.

The diameter $d_2$ should be 40 to 46% of the diameter D.

In some cases the circular annular bed space 10 which can be accommodated in a housing having a diameter that has been selected in view of the centrifugal separator 1 is too small. In such cases two granular beds 10, 10a are arranged one over the other, as is shown in FIG. 3

Part of the entire gas stream, preferably approximately one-half thereof, is fed through the gas outlet pipe 8a into the upper housing part 3c, which is provided with the cover 12a. That part of the gas stream subsequently flows through the bed space 10a and the grate 9a and is conducted through the gas outlet pipe 11a into the pure gas duct 17.

The other part of the gas stream flows from the housing part 3b provided with the cover 12 through the bed space 10 and the grate 9 and through the gas outlet pipe 11 enters the pure gas duct 17.

Figure 3:
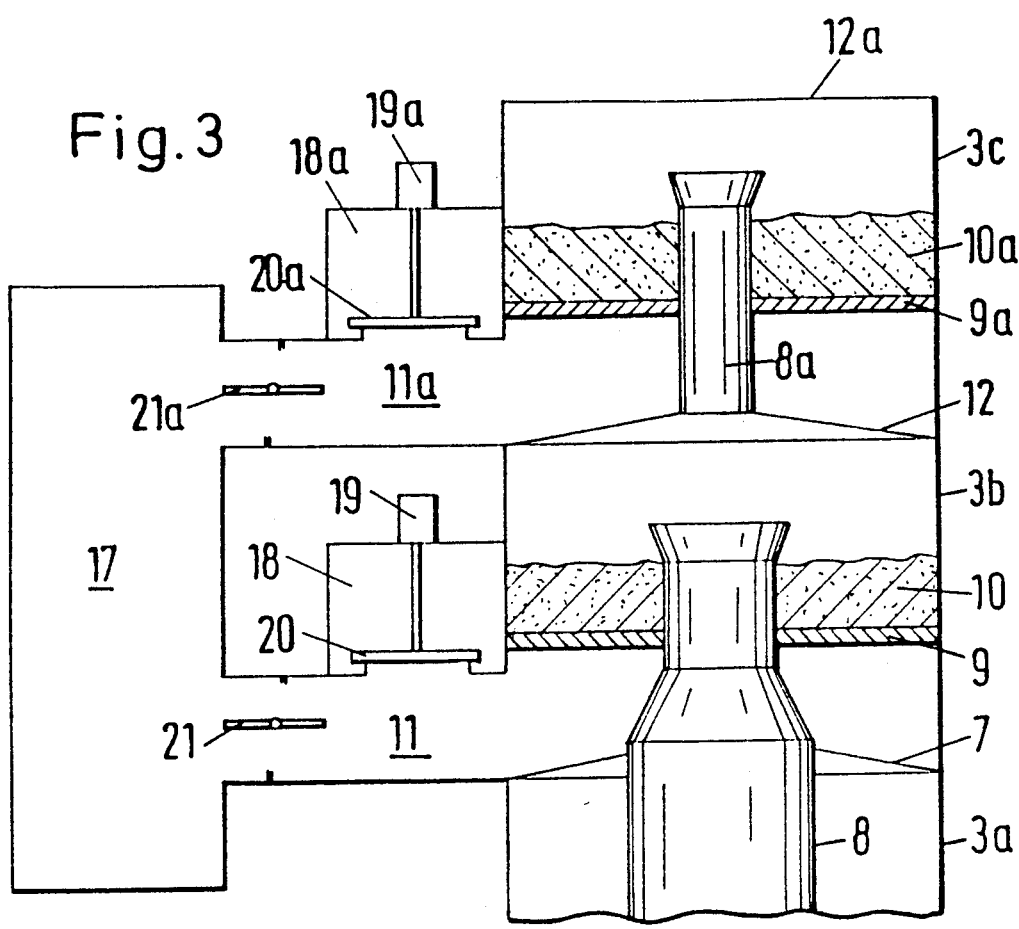
FIG. 3 is a highly simplified vertical sectional view showing an embodiment of the invention with two superimposed granular beds.

FIG. 3 shows also the means for back-purging the bed spaces 10a, 10. Dampers 21, 21a are provided for shutting off the gas flow passage when a back purging is required after a predetermined deducting time or when a predetermined pressure drop has been reached.

When the gas flow passage has been shut off by the dampers 21, 21a, actuators 19, 19a are operated to open the valves 20, 20a so that purging gas can be supplied through the pure gas ducts 18, 18a into the granular bed filter and flows through the grates 9, 9a and the bed spaced 10, 10a oppositely to the normal direction of flow of the gas and reactivates the granular material for the filtering operation.

Figure 4:
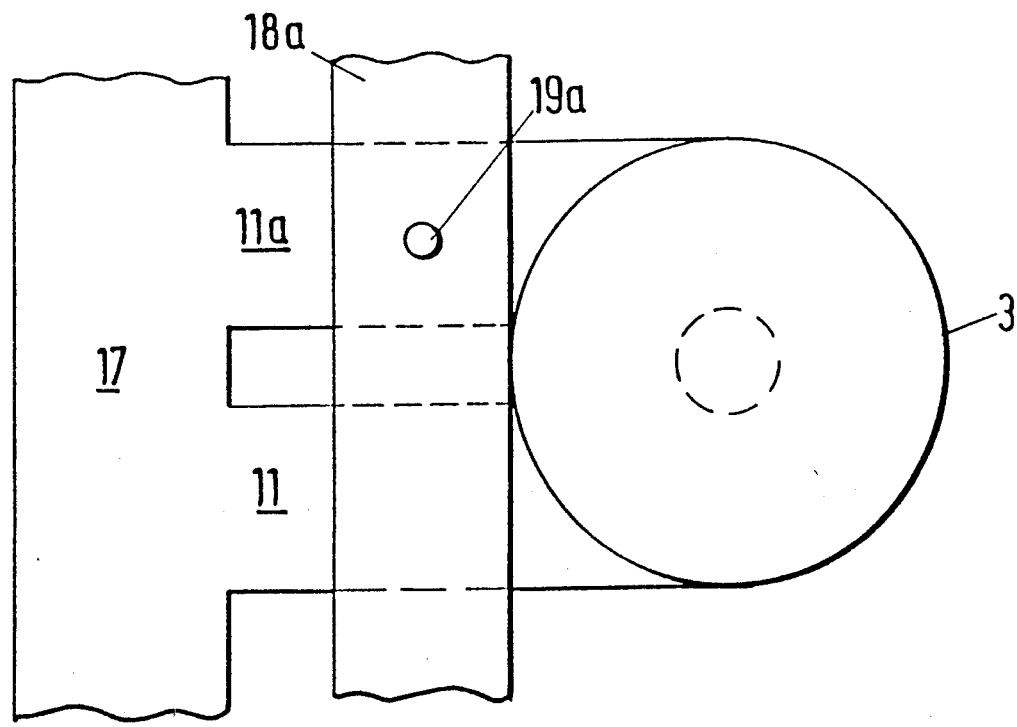
FIG. 4 is a fragmentary top plan view showing the embodiment of FIG. 3.

FIG. 4 is a top plan view showing the apparatus of FIG. 3.

Figure 5:
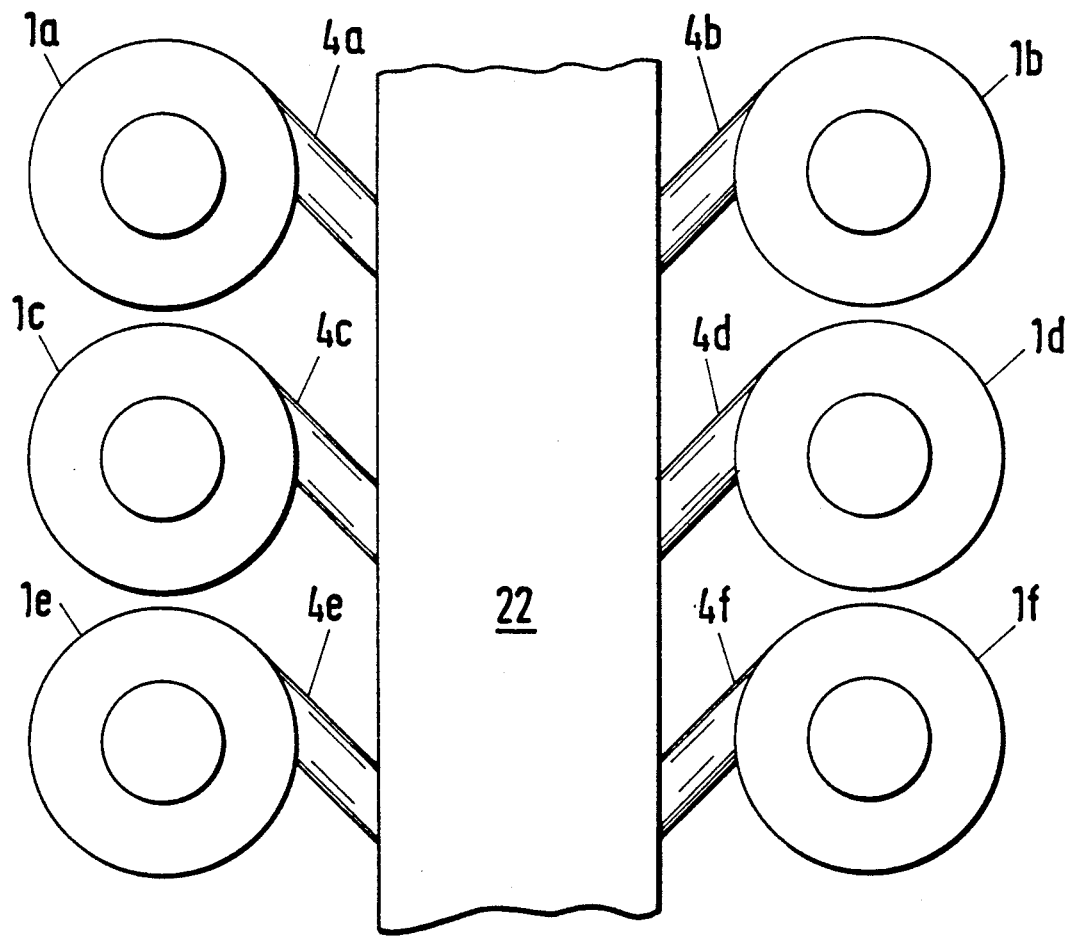
FIG. 5 is a fragmentary horizontal sectional view showing a system comprising a plurality of apparatuses in accordance with the invention.

It is finally apparent from FIG. 5 how a plurality of centrifugal separators 1a to 1f can be connected by a corresponding number of gas inlet pipes 4a to 4f to a common duct 22 for supplying the raw gas and can be associated with each other. A plurality of apparatuses in accordance with the invention are provided and each can comprise a centrifugal separator 1 and a granular bed filter disposed directly thereover. The multiple arrangement is selected for two reasons. For an effective operation, centrifugal separators cannot be designed to have a diameter which is as large as may be desired.

For this reason gas streams at a very high rate must be divided. Besides, in a multiple arrangement it may be ensured that when a cleaning or back purging of one granular bed filter is required and the associated gas flow passage must be shut off the remaining gas flow area will be so large that the gas velocity will not rise to excessively high values.

Such a system is suitably so designed that one or more of such apparatus are provided in addition to the total flow area which is required for the purification of gas at a given rate and the cleaning or back-purging program is so designed that only a flow area which has been provided by the one or more additional apparatus will have to be shut off so that 100% of the required flow area will always be available even during the required back-purging.

We claim:

1. An apparatus for separating solid particles from a gas stream, said apparatus comprising:
   a centrifugal separator for removing at least some of said solid particles from said gas stream, said centrifugal separator comprising:
   a vertical cylindrical housing formed with a partition separating said housing into an upper part and a lower part of a height H,
   a rectangular cross section gas inlet duct opening tangentially into said lower part and having a height equal substantially to 60% to 80% of said height H and a width equal substantially to 20% to 30% of said height H,
   a conically downwardly converging dust-collecting bin disposed below said lower part with said lower part opening axially directly into said bin,
   an outlet formed at a lower end of said bin for discharging solid particles collected from said gas stream from said bin,
   a vertical gas outlet pipe disposed centrally in said housing and having a lower end opening in said lower part and an upper end opening in said upper part above said partition, and
   gas-guiding means in said pipe and extending generally parallel to an axis thereof; and
   a granular bed filter disposed above said centrifugal separator, receiving said gas stream from said centrifugal separator and discharging said gas stream from said apparatus, said granular bed filter comprising:
   a grate extending across said upper part and traversed by said pipe with said upper end of said pipe opening into said upper part of said housing above an annular bed in a shape of a circular ring of filter granules surrounding said upper end of said pipe and supported on said grate, and a gas outlet duct communicating with said upper part of said housing between said grate and said partition for discharging said gas stream, whereby said gas stream traverses said bed from top to bottom, said granular bed filter and said centrifugal separator forming a single structural unit.

2. The apparatus defined in claim 1 wherein said lower housing part has an inside diameter D substantially equal to said height H.

3. The apparatus defined in claim 2 wherein said gas outlet pipe has an inside diameter d substantially equal to 44% to 48% of said inside diameter D of said lower housing part.

4. The apparatus defined in claim 3 wherein said gas-guiding means consist of two crossing webs having a height h of substantially 10% to 20% of said inside diameter D of said lower housing part.

5. The apparatus defined in claim 4 wherein said webs have lower edges set upwardly from a lower end of said gas outlet pipe forming an entrance plane thereof by substantially 5% to 15% of said inside diameter D of said lower housing part.

6. The apparatus defined in claim 2 wherein said gas outlet pipe is formed with a constriction adjacent said bed over a length of substantially 20% to 26% of said inside diameter D of said lower housing part to a diameter $d_1$ which is substantially 35% to 40% of said inside diameter D of said lower housing part.

7. The apparatus defined in claim 6 wherein the gas outlet pipe is formed with a discharge diameter $d_2$ at its upper end which is substantially 40% to 46% of said inside diameter D of said lower housing part.

8. The apparatus defined in claim 7 wherein said outlet pipe has a portion of a diameter d below said constriction, a transition portion between a portion of said diameter d to a portion of said diameter $d_1$ and another transition portion between said portion of diameter $d_1$ to a portion said of said diameter $d_2$, both said transition portions being frustoconical.

9. The apparatus defined in claim 8 wherein said diameter d of said gas outlet pipe is an inside diameter substantially equal to 44% to 48% of said inside diameter D of said lower housing part.

10. The apparatus defined in claim 9 wherein said gas-guiding means consist of two crossing webs having a height h of substantially 10% to 20% of said inside diameter D of said lower housing part.

11. The apparatus defined in claim 10 wherein said webs have lower edges set upwardly from a lower end of said gas outlet pipe forming an entrance plane thereof by substantially 5% to 15% of said inside diameter D of said lower housing part.

12. A system for separating solid particles from a gas stream wherein a plurality of apparatuses as defined in claim 1 are combined in a single structural unit formed with a common gas supply duct for all of said apparatuses, a common gas delivery duct for all of said apparatuses and a common purging gas duct for supplying a purging gas to all of said apparatuses.

13. The system defined in claim 12, further comprising shut off valves in said gas delivery duct and said purging gas duct for selectively disconnecting and backpurging said apparatuses individually.

14. The system defined in claim 12 wherein said lower housing part of each of said apparatuses has an inside diameter D substantially equal to said height H.

15. The system defined in claim 14 wherein said gas outlet pipe of each of said apparatuses has an inside diameter d substantially equal to 44% to 48% of said inside diameter D of said lower housing part.

16. The system defined in claim 15 wherein said gas-guiding means of each of said apparatuses consist of two crossing webs having a height h of substantially 10% to 20% of said inside diameter D of said lower housing part.

17. The apparatus defined in claim 16 wherein said webs have lower edges set upwardly from a lower end of said gas outlet pipe forming an entrance plane thereof by substantially 5% to 15% of said inside diameter D of said lower housing part.

18. The apparatus defined in claim 17 wherein said gas outlet pipe is formed with a constriction adjacent said bed over a length of substantially 20% to 26% of said inside diameter D of said lower housing part to a diameter $d_1$ which is substantially 35% to 40% of said inside diameter D of said lower housing part.

19. The apparatus defined in claim 17 wherein the gas outlet pipe is formed with a discharge diameter $d_2$ at its upper end which is substantially 40% to 46% of said inside diameter D of said lower housing part.

20. The apparatus defined in claim 19 wherein said outlet pipe has a transition portion between a portion of said diameter D to a portion of said diameter $d_1$ and another transition portion between said portion of said diameter $d_1$ to a portion of said diameter $d_2$, both said transition portions being frustoconical.

* * * * *